(12) United States Patent
Hernandez et al.

(10) Patent No.: US 7,734,818 B2
(45) Date of Patent: *Jun. 8, 2010

(54) METHOD TO ADD IPV6 AND DHCP SUPPORT TO THE NETWORK SUPPORT PACKAGE

(75) Inventors: Carol B. Hernandez, Austin, TX (US); Stephen D. Linam, Austin, TX (US); John T. O'Quin, II, Austin, TX (US); Mark W. Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/678,132

(22) Filed: Feb. 23, 2007

(65) Prior Publication Data

US 2008/0209197 A1 Aug. 28, 2008

(51) Int. Cl.
*G06F 15/177* (2006.01)
(52) U.S. Cl. .................. 709/245; 709/222; 370/254
(58) Field of Classification Search .................. None
See application file for complete search history.

(56) References Cited

U.S. PATENT DOCUMENTS

| | | | |
|---|---|---|---|
| 6,345,294 B1 * | 2/2002 | O'Toole et al. | 709/222 |
| 6,466,985 B1 * | 10/2002 | Goyal et al. | 709/238 |
| 6,522,188 B1 * | 2/2003 | Poole | 327/407 |
| 6,757,723 B1 * | 6/2004 | O'Toole et al. | 709/222 |
| 6,857,069 B1 | 2/2005 | Rissmeyer et al. | |
| 6,895,590 B2 | 5/2005 | Yadav | |
| 7,155,537 B1 | 12/2006 | Weber et al. | |
| 7,398,337 B2 | 7/2008 | Arndt et al. | |
| 7,464,403 B2 * | 12/2008 | Hardman, Jr. | 726/14 |
| 2003/0126242 A1 | 7/2003 | Chang | |
| 2003/0145045 A1 | 7/2003 | Pellegrino et al. | |
| 2004/0078679 A1 | 4/2004 | Cagle et al. | |
| 2005/0138346 A1 | 6/2005 | Cauthron | |
| 2005/0216715 A1 | 9/2005 | Matheny et al. | |

(Continued)

FOREIGN PATENT DOCUMENTS

EP 1708422 A2 * 10/2006

(Continued)

OTHER PUBLICATIONS

R. Droms, "Dynamic Host Configuration Protocol", Mar. 1997, pp. 1-45, Bucknell University.

(Continued)

*Primary Examiner*—Wing F Chan
*Assistant Examiner*—Kostas Katsikis
(74) *Attorney, Agent, or Firm*—Dillon & Yudell LLP (57) ABSTRACT

A mechanism is added to a network support package to enable/allow the specification of additional boot discovery protocols and additional network address formats. The mechanism defines qualifier keywords that are added to the boot arguments and processed by the network support package. The qualifier keywords modify the boot arguments associated with a bootstrap method by specifying a way to acquire the arguments (i.e., a specific boot discovery protocol), the format of the arguments, and other parameters associated with the arguments. Multiple qualifier keywords may be added to the boot arguments at a time, and the keywords can be applied in their order within the arguments.

16 Claims, 3 Drawing Sheets

U.S. PATENT DOCUMENTS

| | | |
|---|---|---|
| 2006/0013251 A1 | 1/2006 | Hufferd |
| 2006/0205388 A1 | 9/2006 | Semple et al. |
| 2006/0251257 A1 | 11/2006 | Haverinen et al. |
| 2006/0256736 A1* | 11/2006 | Koehler et al. .............. 370/254 |
| 2007/0054734 A1* | 3/2007 | Morrow et al. ................ 463/29 |
| 2007/0204103 A1 | 8/2007 | Wilkinson et al. |

FOREIGN PATENT DOCUMENTS

| | | | |
|---|---|---|---|
| JP | 2005071242 A | * | 3/2005 |

OTHER PUBLICATIONS

M. Chadalapaka, "Internet Small Computer Systems Interface", Apr. 2004, pp. 1-211, The Internet Society.

D. Missimer, "Bootstrapping Clients Using the Internet Small Computer System Interface (iSCSI) Protocol", Sep. 2005, pp. 1-12, The Internet Society.

"Open Firmware Recommended Practice: TFTP Booting Extension Version 1.0", Aug. 22, 2006, Open Firmware Working Group, http://playground.sun.com/1275/practice/obp-tftp/tftp1_0.pdf.

"PowerPC Microprocessor Common Hardware Reference Platform (CHRP) Binding (Accepted version 1.8, Feb. 2, 1009)", Feb. 2, 1998, Open Firmware Working Group, http://playground.sun.com/1275/home.html#OFDplatCHRP.

Office Action mailed on Jun. 25, 2009 for U.S. Appl. No. 11/678,124 entitled "Method to Enable InfiniBand Network Bootstrap".

Office Action mailed on Jul. 6, 2009 for U.S. Appl. No. 11/678,133 entitled "Method to Enable InfiniBand Network Bootstrap".

* cited by examiner

METHOD TO ADD IPV6 AND DHCP SUPPORT TO THE NETWORK SUPPORT PACKAGE

RELATED APPLICATIONS

The present application is related to the subject matter of commonly assigned, patent application Ser. No. 11/678,116. Relevant content of that co-pending patent application is incorporated herein by reference.

BACKGROUND OF THE INVENTION

1. Technical Field

The present invention generally relates to computer network systems and in particular to use of network support packages within computer network systems. Still more particularly, the present invention relates to enhanced methods for utilizing a network support package to load a computer system's boot image from a boot server.

2. Description of the Related Art

Network computer systems are generally known in the art. Also known is the general method for loading a boot image of a computer system from a remote boot server over a network. When booting a computer system over a network, the computer system's firmware typically utilizes the Trivial File Transfer Protocol (TFTP) to obtain the boot file from a boot device across the network. A network support package is provided to assist this remote (network) boot operation by processing the boot arguments obtained from the computer system and establishing a connection with a remote server to obtain the boot file. The network support package utilizes the TFTP bootstrap method to retrieve and/or define specific boot arguments. General information about the utilization of the network support package to enable loading of boot image from a remote boot server may be found within Open Firmware Recommended Practice: TFTP Booting Extension Version 1.0, which is published by the Open Firmware Working Group.

The standard network support package utilizes the TFTP bootstrap method to boot a system over the network. The boot arguments for the TFTP bootstrap method offer the option of specifying the bootstrap protocol (BOOTP) protocol to find a boot server and the boot file. Thus current (existing) definitions of boot arguments provide the option of utilizing the BOOTP, as opposed to RARP/ARP (Address Resolution Protocol) for example, to find a boot server and obtain the boot file. If the BOOTP protocol is not specified, other protocols such as RARP/APR may be utilized to get the boot file. Also, with the conventional methods, all arguments representing network addresses are specified in IPv4 format (Internet Protocol version 4).

Continuing developments have led to creation of more advanced IP format, such as IPv6. However, the existing arguments and corresponding methods for enabling remote boot operations still utilize IPv4 format, since the IPv6 format had not been previously defined. Also, with the existing methods, Dynamic Host Configuration Protocol (DHCP) was not considered an alternative boot discovery protocol for TFTP bootstrap. The present invention thus recognizes that a need exists for upgrading the existing methods of remote boot operations to enable use of IPv6 format and DHCP to acquire the information needed to boot a system using a boot file stored on a remote server.

SUMMARY OF THE INVENTION

Disclosed is a method and system that extend the functionality of the network support package to accept network addresses in IPv6 format and allow the use of other boot discovery protocols, such as Dynamic Host Configuration Protocol (DHCP), to acquire the information needed to boot a system using a boot file from a remote boot server. A mechanism is added to the network support package to enable/allow additional boot discovery protocols and additional network address formats to be supported. The mechanism defines qualifier keywords that are added to the boot arguments and processed by the network support package. The qualifier keywords modify the boot arguments associated with a bootstrap method by specifying a way to acquire the arguments (i.e., a specific boot discovery protocol), the format of the arguments, and other parameters associated with the arguments. Qualifier keywords are optionally specified before the arguments associated with the bootstrap method to modify the handling of the boot arguments. Multiple qualifier keywords may be added to the boot arguments at a time, and the keywords are applied in the order they are found within the arguments.

In one embodiment, two qualifier keywords are defined, namely ipv6 and dhcp. The ipv6 keyword is optionally added before the first boot argument to indicate that any network addresses provided in the boot arguments are expressed using the IPv6 format. Absence of the keyword "ipv6" indicates that all network addresses are expressed in IPv4 format. The dhcp keyword is utilized to indicate that a DHCP server should be utilized by the network support package to obtain boot parameters. A diaddr value may be optionally provided to specify the internet address of the DHCP server to be used. Otherwise, the network support package performs a broadcast query to find a DHCP server. The diaddr value is expressed in either IPv6 or IPv4 notation, depending on whether the optional qualifier keyword ipv6 is specified or not.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system that extends the network support package of a computer network system to accept network addresses in IPv6 format and allow the use of other boot discovery protocols, such as DHCP, to acquire the information needed to boot a system using a boot file stored on a remote server.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

Figure 1:
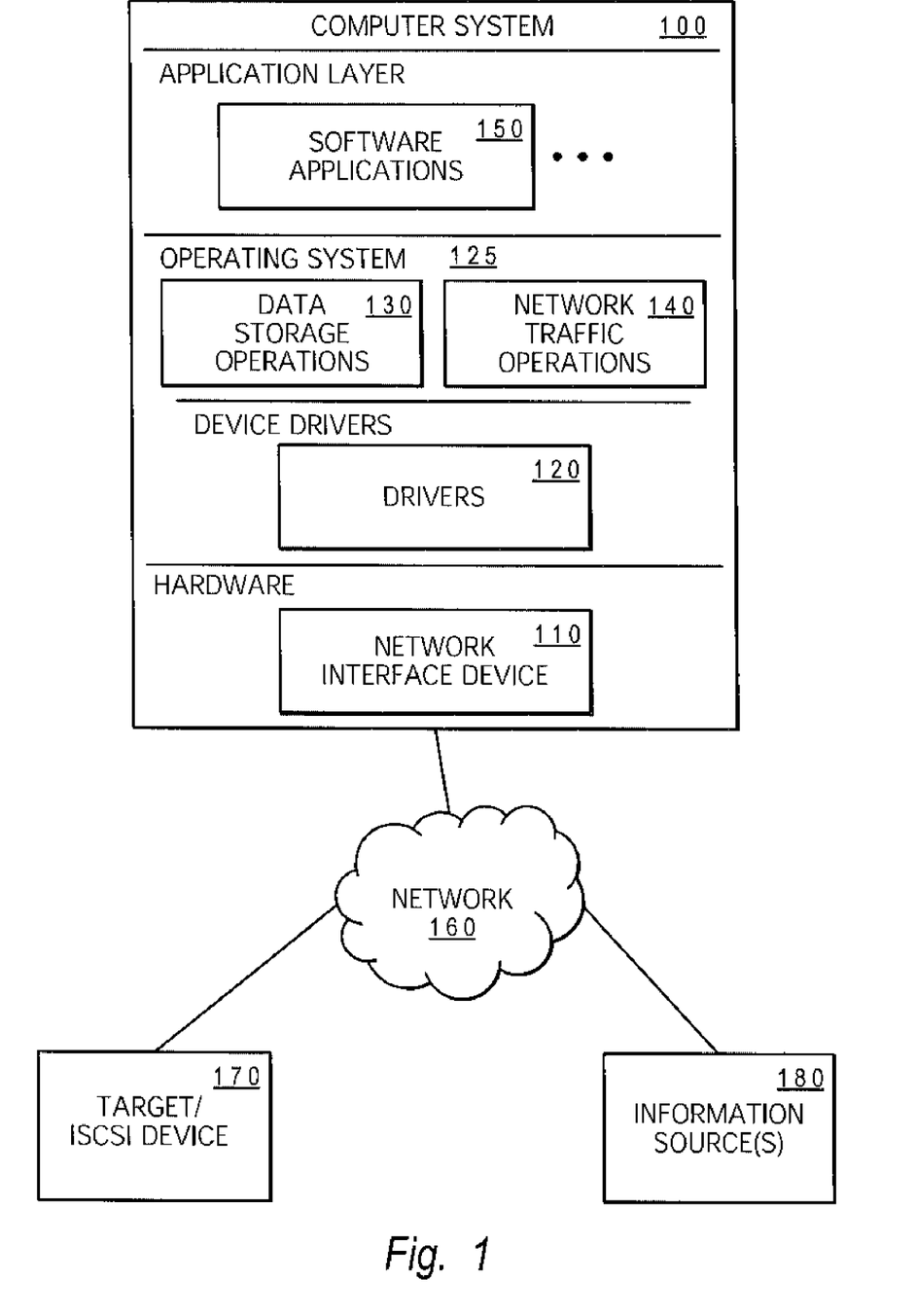
FIG. 1 is a block diagram illustrating an example computer system (client) coupled to an Internet Small Computer System Interface (iSCSI) device (boot server or target) via a network, in accordance with one embodiment of the invention.

With reference now to the figures, FIG. 1 is a block diagram illustrating a structural representation of computer system 100 connected via network 160 to remote iSCSI device (170) (e.g., boot server or target) and one or more information sources 180 (e.g., DHCP server or BOOTP server). Throughout this description, iSCSI device 170 is interchangeably referred to as "target" or "iSCSI server" or "boot server." Computer system 100 may also be referred to as "initiator" or "client" or "client device." Computer system 100 may be a personal computer, a server, a mobile or handheld electronic device, or other data processing machine. Network 160 may be a local area network, metropolitan area network, wide area network, or other type of machine network. Network 160 may be a wired or wireless network and may use a connectionless packet-switched protocol, such as Internet Protocol (IP), and/or other network protocols.

Computer system 100 includes network interface device 110 that connects computer system 100 to network 160. Network device 110 represents a hardware component of computer system 100 and may be a network interface card (NIC) or an integrated network device (e.g., a network adapter built into a main circuit board, such as a motherboard, of computer system 100).

Device drivers 120 control network interface device 110, providing a conduit through which operating system (OS) 125 and one or more software applications 150 in an application layer of computer system 100 may communicate with network 160. Device drivers 120 allow data storage operations 130 to be performed over the network 160 using network interface device 110. For example, device drivers 120 may include an iSCSI initiator that allows SCSI commands to interact with a storage target, iSCSI device 170, over network 160.

At least one of device drivers 120 may support booting from iSCSI device 170 over network 160, in which case iSCSI device 170 represents a remote boot device. As a remote boot device, iSCSI device 170 is initialized before loading a boot image (of an operating system) to computer system 100 via a series of processes completed over network 160. The iSCSI device 170 may be located in physical space either close to or far away from computer system 100. For example, iSCSI device 170 may be connected to computer system 100 through a local area network 160 (e.g., a gigabit Ethernet) and may be located in the same building, rack, or cabinet as computer system 100.

Additionally, device drivers 120 allow network traffic operations 140 to be performed over network 160 using network interface device 110. At least one of device drivers 120 may present itself as a network device driver to the operating system and support general purpose network traffic. Thus, the operating system may view and interact with one of the drivers 120 as though the driver was a conventional network device driver loaded after bus drivers and storage drivers in the computer system's boot process. The network traffic supported may include multiple different networking protocols, such as TCP/IP, ODI (Open Data-link Interface), PXE (Pre-Boot Execution Environment), and various other standardized and/or company/operating system based networking protocols, depending upon implementation. In general, device drivers 120 allow computer system 100 to communicate with one or more information sources 180 using multiple networking protocols.

Although device drivers 120 of computer system 100 appear in FIG. 1 to be in a layer separate from the operating system and the hardware, it should be understood that the device drivers may operate in different contexts within computer system 100 depending upon implementation and the state of operation, from power off, through the boot sequence, up until an operational mode is reached, where the operating system is fully loaded and in control of computer system 100. Moreover, various driver functions described herein can be implemented in hardware, firmware and/or software.

As described above, device drivers 120 may support booting to a remote boot server (target iSCSI device 170) and support general purpose network traffic, while at least one of device drivers 120 presents itself as a network device driver to the firmware. Booting to the remote boot device may be completed using iSCSI protocol, where SCSI commands are encapsulated in the TCP/IP protocol and sent to the target device using a software iSCSI initiator or an iSCSI TOE adapter represented as a network-type device within the firmware's hierarchical structure. Thus, while the invention is described and illustrated from the perspective of a standard network boot process, the described features of the invention are equally applicable to an iSCSI boot process, wherein remote boot server (Target iSCSI device 170) is an iSCSI device. Specific description of the iSCSI boot process is provided within co-pending patent application Ser. No. 11/678,116, relevant contents of which are incorporated herein by reference.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The computer system depicted in FIG. 1 may be, for example, an IBM eServer pSeries system, a product of International Business Machines Corporation in Armonk, N.Y.

Within the above example computer system and network environment, a mechanism is added to the network support package to enable/allow additional boot discovery protocols and additional network address formats to be supported. The mechanism defines qualifier keywords that are added to the boot arguments generated by system firmware and processed by the network support package. In one embodiment, the qualifier keywords modify the boot arguments associated with a bootstrap method by specifying a way to acquire the additional parameters/arguments (i.e., via a specific boot discovery protocol), the format of the parameters/arguments, and other parameters associated with the remote boot process. Qualifier keywords are optionally added before the arguments associated with the bootstrap method to modify the boot arguments. Multiple qualifier keywords may be added at a time to the boot arguments, and the keywords are applied in the order they are found within the arguments.

The current/existing boot arguments, utilized prior to the present invention with standard bootstrap operations, are provided below. Each argument is then provided its respective definitions and/or descriptions. Thus, an existing boot argument provides:

[bootp,] siaddr, filename, ciaddr, giaddr, bootp-retries, tftp=retries, subnet-mask, blksize Within this boot argument, the definition and usage of the provided terms include:

siaddr, which is the IP address of the TFTP server;
filename, which is the filename of the file that is to be loaded by TP from the server.
ciaddr, which is the IP address of the client (i.e., the system being booted);
qiaddr, which is the IP address of the BOOTP 'gateway' and it is not necessarily the same as the network gateway;
bootp-retries, which is the maximum number of retries that are attempted before the BOOTP process is determined to have failed;
tftp-retries, which is the maximum number of retries that are attempted before the TFTP process is stopped;
subnet-mask, which is a 32-bit mask that defines the local network scope of all the IP addresses on this particular subnet; and
blksize, which is a decimal number that specifies the number of octets in a block for a TFTP read or write request.

The above arguments provided to network support package specify the TFTP bootstrap method to boot a computer system over the network. The boot arguments for the TFTP bootstrap method offer the option of specifying the BOOTP protocol to find a boot server and the boot file. If the BOOTP protocol is not specified, other protocols, including specifically RARP/APR, may be used to obtain the boot file.

One embodiment of the invention extends the above boot arguments to include additional keywords and associated arguments, where appropriate. In the illustrative embodiment, an example extended boot argument supported by the modified network support package comprises the following:

[ipv6,] [dhcp [=diaddr,]] [bootp,]siaddr,filename,ciaddr, giaddr,bootp-retries,tflp-retries,subnetmask,blksize.

As provided within the above illustrative embodiment of an extended boot argument, two qualifier keywords (indicated in bold) are defined within the extended boot arguments, namely ipv6 and dhcp, with dhcp having a corresponding argument diaddr. The ipv6 keyword is optionally added before the first boot argument to indicate that any/all network addresses provided within the boot arguments are expressed using the IPv6 format. In the embodiment shown, absence of the keyword "ipv6" indicates that all network addresses are expressed in IPv4 format. Thus, IPv4 remains the default network address format and does not have to be specifically added in front of the arguments. Keyword ipv6 precedes any other qualifier keywords used in the arguments, according to the described embodiment.

The dhcp keyword is utilized to indicate that a Dynamic Host Configuration Protocol (DHCP) server will be utilized to obtain boot parameters. A diaddr value may be optionally provided to specify the internet address of the DHCP server to be used. Otherwise, if no diaddr value is provided, the network support package issues a broadcast query to find a DHCP server on the network. The diaddr value is expressed in either IPv6 or IPv4 notation, depending on whether the optional qualifier keyword ipv6 is specified or not. When accessed, the DHCP server may provide the client address (ciaddr), the server address (siaddr) and the filename for TFTP bootstrap. A description of how these and other arguments are acquired from a DHCP server is provided within RFC 2131: Dynamic Host Configuration Protocol, published by IETF.

Figure 2:
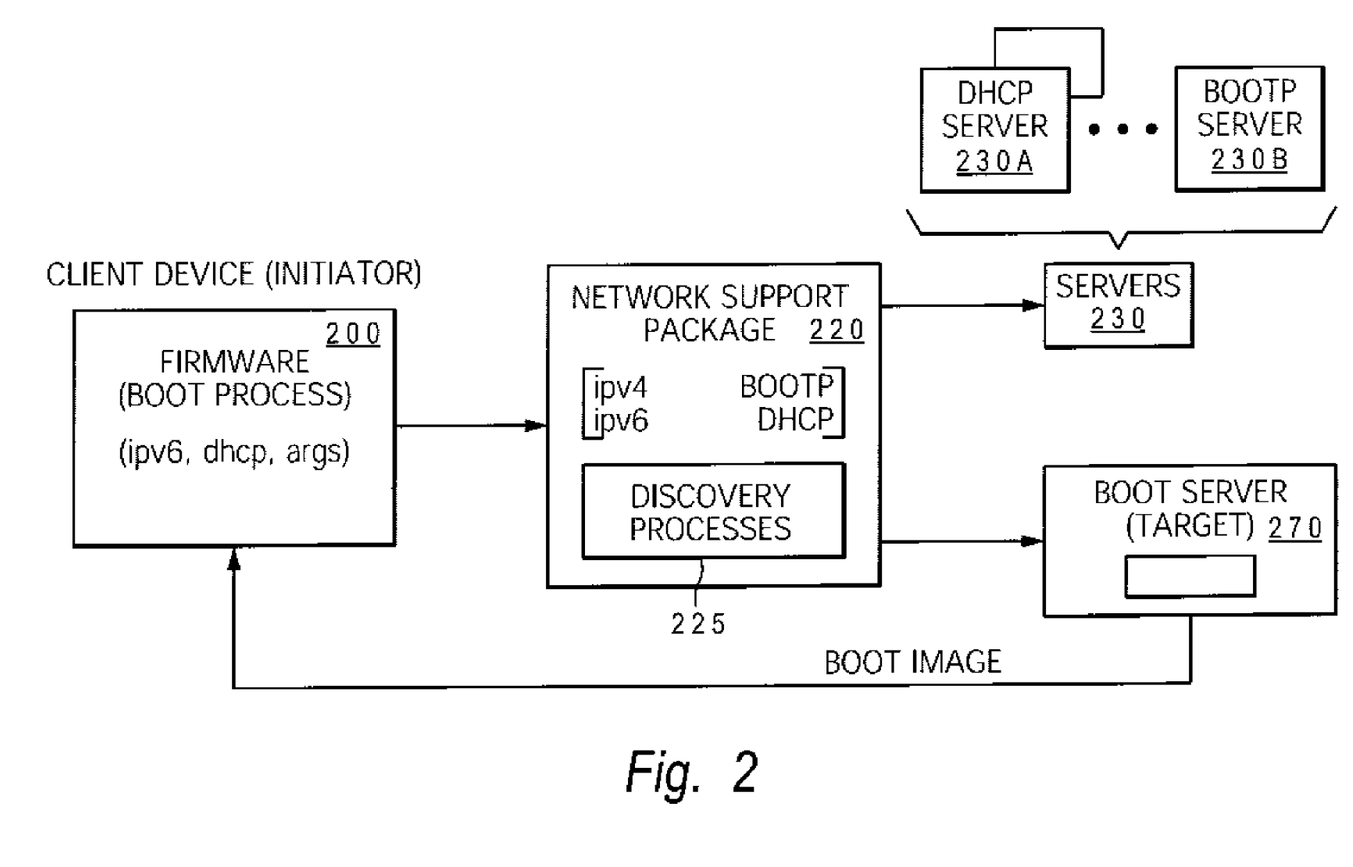
FIG. 2 illustrates an example process flow by which system firmware of computer system communicates boot arguments extended with specific keywords to a modified network support package, which ultimately accesses a DHCP server to obtain boot parameters, according to one illustrative embodiment of the invention.

FIG. 2 is a block diagram representation of an example system, with primary components (hardware and software utility) that enable the utilization of the extended boot arguments by modified/enhanced network support package 220 to enable use of IPv6 address format and alternate protocols to find boot parameters, such as DHCP, according to one illustrative embodiment of the invention. As shown, the system comprises firmware 200 of a client device (which is an initiator in the iSCSI environment), e.g., computer system 100, communicatively coupled to modified/enhanced network support package 220. Network support package 220 is in turn communicatively coupled to servers 230, including DCHP server(s) 230A and BOOTP server 230B, and boot server (iSCSI device) 270 (which is the target in the iSCSI environment). According to the described embodiment, servers 230 represent the collective of different server types that may be accessed by corresponding boot discovery protocols 225 to obtain parameters required for accessing boot server 270.

When implemented within an iSCSI environment, boot server 270 includes a disk support package, which is utilized to access logical units (LUNs) associated with (or accessible from) boot server 270. With this alternate implementation, the disk support package enables retrieval of boot image for use by client device 100 based on boot arguments provided by system firmware 200 to network support package 220 and/or parameters retrieved from servers 230 by network support package 220.

According to one embodiment of the invention, modified/enhanced network support package 220 is provided a mechanism that enables network support package to receive boot arguments that comprise keywords, including ipv6 and dhcp. More specifically, modified/enhanced network support package 220 provides support for IPv6 address format and enables retrieval of boot server address and other information from a DHCP server.

The ipv6 and dhcp extensions apply equally to network boot and iSCSI boot, which is another bootstrap method that involves accessing a disk (LUN) in the target server to obtain the OS image. However, as further described below, with network boot, TFTP is the bootstrap method utilized for completing the network boot, and TFTP is the default bootstrap method when an iSCSI keyword is not added to the boot arguments. The addition of an iSCSI keyword to the boot arguments is described in related patent application Ser. No. 11/678,116, which has been previously incorporated herein by reference. Either the TFTP bootstrap method or the iSCSI bootstrap method may be utilized, and the extensions of ipv6 and dhcp apply to both a network boot process as well as an iSCSI boot process.

Figure 3:
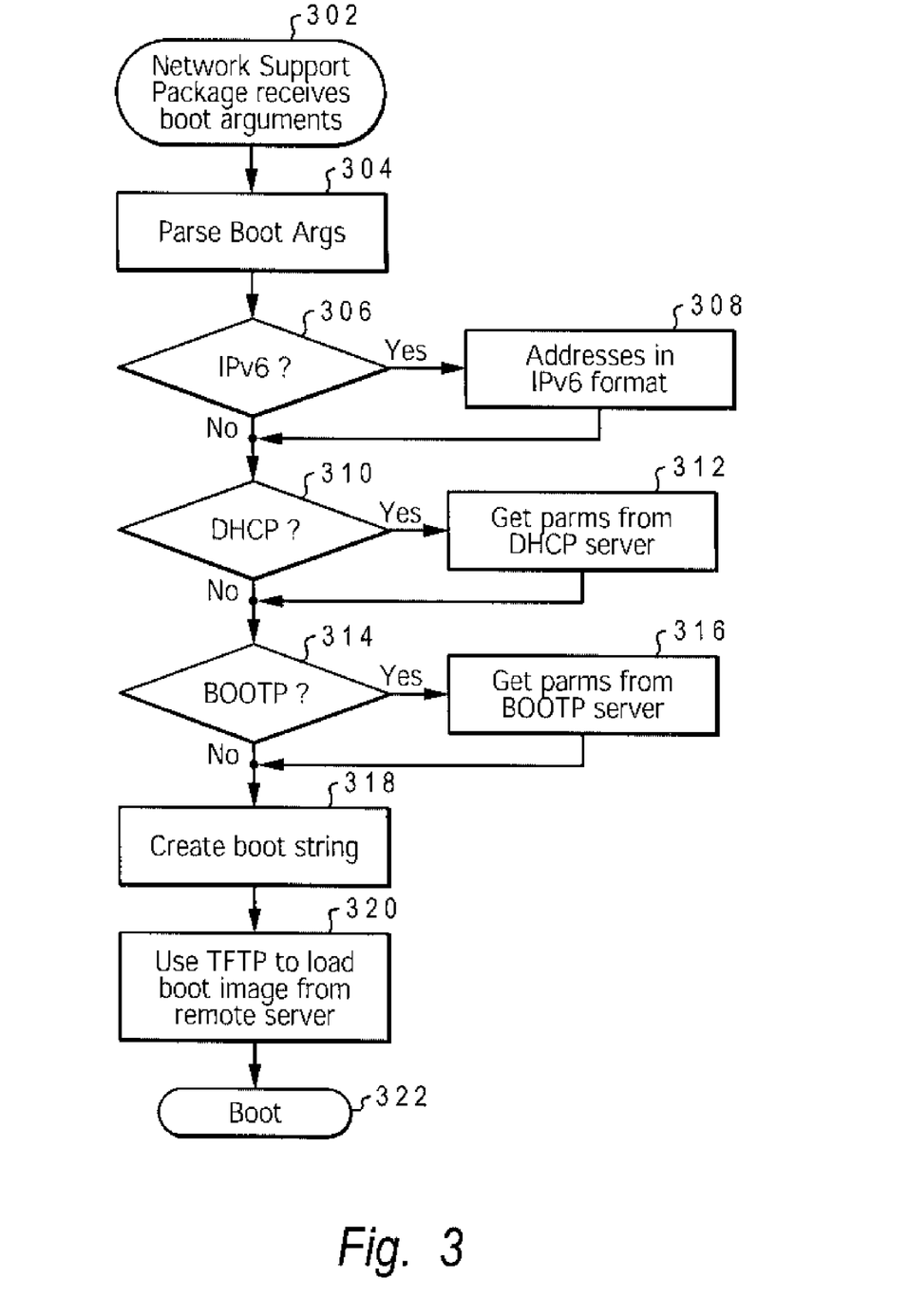
FIG. 3 is a flow chart illustrating the process by which the network support package processes extended boot arguments to complete loading of a boot image from a boot server using IPv6 address format and parameters retrieved from a DHCP server, in accordance with an illustrative embodiment of the invention.

FIG. 3 is a flow chart, which illustrates the process by which the network support package utilizes the extended boot arguments to enable use of IPv6 addressing format and specify alternate protocols to find boot parameters, such as DHCP, according to one embodiment of the invention. The process begins at block 302 which illustrates modified/enhanced network support package 220 receiving the boot arguments (from system firmware). Enhanced network support package 220 parses the boot arguments, as shown at block 304 and determines at block 306 if the boot arguments contain keyword ipv6. When the keyword ipv6 is contained within the boot arguments, network support package 220 processes addresses in IPv6 format and performs addressing functions using addresses in IPv6 format, as provided at block 308.

Then, at block 310, network support package 220 determines whether the boot arguments contain the keyword dhcp. If keyword dhcp is contained within the boot arguments, network support package 220 obtains the addressing and other parameters from a DHCP server, as shown at block 312. As previously described, keyword dhcp may comprise an argument 'diaddr', which directs network support package 220 to the exact DHCP server from which the boot server addresses and other parameters are to be obtained. Alternatively, when no arguments are provided with keyword dhcp, network support package 220 issues a broadcast to find a DHCP server on the network.

Following retrieval of the various addressing parameters from the DHCP server (or when dhcp is not included within the boot arguments), network support package 220 determines, at block 314, whether or not additional boot discovery protocols are indicated within the boot arguments. When BOOTP is one of the boot arguments (i.e., following one or both of the above keywords or without either keyword being present within the boot arguments), then network support package 220 retrieves the addressing and other boot parameters from the BOOTP server, as illustrated at block 316. Network support package 220 generates/creates a boot string as shown at block 318. Network support package 320 then utilizes the default bootstrap protocol, TFTP, to load the boot image from remote server, as shown at block 320. The firmware then completes the boot process at computer system 100, as indicated at block 322.

The following examples provide illustrations of both (a) conventional boot arguments to complete boot image retrieval via IPv4 addressing format and BOOTP discovery protocol, and (b) extended boot arguments to complete boot image retrieval via IPv6 addressing format and/or using DCHP discovery protocol. The latter examples rely on use of specific keywords and arguments provided in addition to the other arguments within the conventional bootstrap method. The first two conventional examples now follow:

EXAMPLE 1

With the present example, all the arguments are provided in the command line. A boot discovery protocol is not utilized. Also, all the addresses, i.e. siaddr, ciaddr, are expressed in IPv4 format.

open network-device: promiscuous, speed=100, duplex=full, siaddr, filename, ciaddr, giaddr, bootp-retries, tftp-retries, subnet-mask

EXAMPLE 2

In the second conventional example, a BOOTP server is used to acquire the siaddr and filename. Other arguments not specified assume default values.

open network-device: duplex=full, bootp

The following examples now illustrate the method for selecting an alternate boot discovery protocol and a different address representation, namely DHCP and IPv6.

EXAMPLE 3

With the current example, the DHCP server specified by diaddr is utilized to acquire the ciaddr, siaddr, and filename. Other arguments not specified assume default values. The diaddr is expressed in IPv6 format.

open network-device: promiscuous, speed=100, duplex=full,ipv6, dhcp=diaddr

EXAMPLE 4

In the present example, the network support package issues a broadcast query to find a DHCP server. Then, the DHCP server returned by the query is utilized to acquire the ciaddr, siaddr, and filename. Again, other arguments not specified assume default values. The diaddr is expressed in IPv4 format.

open network-device: duplex=full, dhcp

EXAMPLE 5

With this next example a DHCP server is utilized to acquire the ciaddr. Other arguments not specified assume default values.

open network-device: promiscuous, speed=100, duplex=full, , dhcp, siaddr, filename, , , bootp-retries, , subnet-mask, blksize

EXAMPLE 6

With this final example, siaddr, and ciaddr are utilized to connect to the boot server and obtain the boot file's filename. The siaddr and ciaddr are expressed in IPv6 format. Other arguments not specified assume default values.

open network-device: duplex=full, ipv6, siaddr, filename, ciaddr, , , ,blksize

The above description of the invention involves the use of specific terms/terminology, some of which are defined by the IETF standards board. Where other names are utilized to describe similar functions and/or functionality, it is understood that the invention extends in scope to cover all general functions and/or features regardless of nomenclature utilized. It is also understood that the use of specific parameter names are for example only and not meant to imply any limitations on the invention. The invention may thus be implemented with different nomenclature/terminology utilized to describe the above parameters, without limitation.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, and CD ROMs.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   receiving at a network support package a set of extended boot arguments;
   determining whether the set of extended boot arguments contains a first keyword indicating use of a first address format among multiple supported address formats; and
   when the first keyword is contained within the set of extended boot arguments, processing all addresses in the first address format and performing addressing functions using addresses in the first address format;
   wherein the first keyword is ipv6 and the first address format is Internet Protocol version 6 (IPv6); and
   the ipv6 keyword is optionally specified within the set of extended boot arguments to indicate that all network addresses provided within the set of extended boot arguments are expressed using the IPv6 format.

2. The method of claim 1, further comprising:
   determining whether the set of extended boot arguments contains a second keyword indicating selection of a first boot discovery protocol and a corresponding first information server; and
   when the second keyword is contained within the set of extended boot arguments, initiating the first boot discovery protocol to retrieve boot parameters from the first information server.

3. The method of claim 2, wherein:
   said second keyword is dhcp and said first boot discovery protocol is a Dynamic Host Configuration Protocol (DHCP) which retrieves the boot parameters from a DHCP server; and
   said DHCP server provides one or more of a client address (ciaddr), a server address (siaddr), and a filename for Trivial File Transfer Protocol (TFTP) bootstrap.

4. The method of claim 2, further comprising:
   determining whether the second keyword has an associated first argument indicating a specific network address of a specific information server from which the boot parameters are retrieved via a specific discovery protocol;
   when the first argument is present, directing a retrieval of the boot parameters to the specific network address indicated by the first argument; and
   when the first argument is not present or does not identify an existing information server, issuing a broadcast across a connected network to find the specific information server.

5. The method of claim 2, further comprising:
   when the second keyword is not included within the set of extended boot arguments, initiating a TFTP bootstrap process, wherein said boot parameters are retrieved from a bootstrap protocol (BOOTP) server if the BOOTP discovery protocol is specified;
   generating a boot string of boot arguments and boot parameters for accessing a boot server; and
   initiating a process for loading a boot file from the boot server via TFTP, wherein a computer system receives the boot file and completes a boot process at the computer system.

6. The method of claim 1, further comprising:
   generating a set of boot arguments for a computer system that requires completion of a boot process via a network;
   extending the set of boot arguments with the first keyword to create the set of extended boot arguments, said first keyword indicating a specific address format for all address-type arguments contained within both the set of extended boot arguments and within boot parameters that are retrieved from an information server; and
   forwarding the set of extended boot arguments to the network support package to initiate the retrieval of the boot parameters and completion of the boot process.

7. The method of claim 6, further comprising:
   further extending the set of extended boot arguments with a second keyword, said second keyword identifying, to the network support package, a specific boot discovery protocol to implement for retrieving additional boot parameters required to complete the boot process, wherein said specific boot discovery protocol further identifies a specific information server from which the additional boot parameters are to be retrieved.

8. The method of claim 7, further comprising:
   adding a first argument to distinguish the second keyword, wherein the first argument identifies a specific network address of a first information server.

9. The method of claim 7, further comprising:
   extending the network support package to accept network addresses in IPv6 format and allow the use of DHCP as a boot discovery protocol to acquire the boot parameters required to boot the computer system using a boot file stored on a remote server; and
   when a received set of boot arguments does not contain the first keyword or the second keyword, initiating a boot process utilizing IPv4 address format and a TFTP bootstrap method with a bootstrap protocol (BOOTP) server if the BOOTP discovery protocol is specified.

10. A device comprising:
    a processor;
    a network support package executed by said processor and which is modified to enable processing of addresses in Internet Protocol version 6 (IPv6) address format and utilization of a Dynamic Host Configuration Protocol (DHCP) to obtain boot parameters from DHCP servers;
    means for communicatively accessing one or more information servers, including a DHCP server and a bootstrap protocol (BOOTP) server; and
    means for communicatively accessing a boot server from which a boot file may be loaded for booting a computer system across a network;
    means for receiving a set of boot arguments;
    means for determining whether the set of boot arguments contains a first keyword indicating use of a first address format among multiple supported address formats; and
    when the first keyword is contained within the set of boot arguments, means for processing all addresses in the first address format and performing addressing functions using addresses in the first address format;
    wherein the first keyword is ipv6 and the first address format is Internet Protocol version 6 (IPv6); and
    the ipv6 keyword is specified to indicate that all network addresses provided within the set of boot arguments are expressed using the IPv6 format.

11. The device of claim 10, said network support package further comprising means for:

determining whether the set of boot arguments contains a second keyword indicating selection of a first boot discovery protocol and corresponding first information server; and when the second keyword is contained within the set of boot arguments, initiating the first boot discovery protocol to retrieve the boot parameters from the first information server.

12. The device of claim 11, wherein:

said second keyword is dhcp and said first boot discovery protocol is a Dynamic Host Configuration Protocol (DHCP) which retrieves the boot parameters from a DHCP server; and said DHCP server provides one or more of a client address (ciaddr), a server address (siaddr), and a filename for Trivial File Transfer Protocol (TFTP) bootstrap.

13. The device of claim 11, said network support package further comprising means for:

determining whether the second keyword has an associated first argument indicating a specific network address the first information server from which the boot parameters are retrieved via the first boot discovery protocol;

when the first argument is present, directing the retrieval of the boot parameters to the specific network address indicated by the first argument; and when the first argument is not present or does not identify an existing information server, issuing a broadcast across a connected network to find the first information server.

14. The device of claim 11, said network support package further comprising means for:

when the second keyword is not included within the set of boot arguments, initiating a standard Trivial File Transfer Protocol (TFTP) bootstrap process, wherein the boot parameters are retrieved from the bootstrap protocol (BOOTP) server if the BOOTP discovery protocol is specified;

generating a boot string of boot arguments and boot parameters for accessing the boot server; and initiating a process for loading the boot file from the boot server via TFTP, wherein the computer system receives the boot file and completes the boot process at the computer system.

15. A computer program product comprising:

a computer readable medium; and program code on the computer readable medium that when executed provides the functions of:

receiving a set of boot arguments;

evaluating the set of boot arguments; and completing a boot process by which a boot file is returned to a computer system from a boot server across a network, said completing the boot process comprising:

(a) determining whether the set of boot arguments contains a first keyword indicating use of a first address format among multiple supported address formats; and when the first keyword is contained within the set of boot arguments, processing all addresses in the first address format and performing addressing functions using addresses in the first address format;

(b) determining whether the set of boot arguments contains a second keyword indicating selection of a first boot discovery protocol and corresponding first information server; and when the second keyword is contained within the set of boot arguments, initiating the first boot discovery protocol to retrieve boot parameters from the first information server;

(c) determining whether the second keyword has an associated first argument indicating a network address of a specific information server from which the boot parameters are retrieved via the first boot discovery protocol;

when the first argument is present, directing a retrieval of the boot parameters to the network address indicated by the first argument; and when the first argument is not present or does not identify an existing information server, issuing a broadcast across a connected network to find the specific information server; and (d) when the second keyword is not included within the set of boot arguments, initiating a Trivial File Transfer Protocol (TFTP) bootstrap process, wherein said boot parameters are retrieved from a bootstrap protocol (BOOTP) server if the BOOTP discovery protocol is specified;

generating a boot string of boot arguments and boot parameters for accessing a boot server; and initiating a process for loading a boot file from the boot server via TFTP, wherein the computer system receives the boot file and completes the boot process at the computer system, and wherein the computer readable medium is a recordable type medium;

wherein the first keyword is ipv6 and the first address format is Internet Protocol version 6 (IPv6): the ipv6 keyword is optionally specified within the set of boot arguments to indicate that all network addresses provided within the set of extended boot arguments are expressed using the IPv6 format;

said second keyword is dhcp and said first boot discovery protocol is a Dynamic Host Configuration Protocol (DHCP) which retrieves the boot parameters from a DHCP server; and said DHCP server provides one or more of a client address (ciaddr), a server address (siaddr), and a filename for TFTP bootstrap.

16. The computer program product of claim 15, further comprising program code that when executed provides the functions of:

generating the set of boot arguments for the computer system that requires completion of the boot process via the network;

extending the set of boot arguments with the first keyword to create a set of extended boot arguments, said first keyword indicating a specific address format for all address-type arguments contained within both the set of extended boot arguments and within the boot parameters that are retrieved from an information server;

further extending the set of extended boot arguments with the second keyword, said second keyword identifying to the network support package the specific boot discovery protocol to implement for retrieving additional boot parameters required to complete the boot process, wherein said specific discovery protocol further identifies a specific information server from which the additional boot parameters are to be retrieved;

optionally adding the first argument to distinguish the second keyword, wherein the first argument identifies a specific network address of a first information server; and forwarding the set of extended boot arguments to the network support package to initiate the retrieval of the boot parameters and completion of the boot process.

* * * * *